United States Patent
Loewen et al.

(10) Patent No.: US 8,968,547 B2
(45) Date of Patent: Mar. 3, 2015

(54) METHOD FOR CORIUM AND USED NUCLEAR FUEL STABILIZATION PROCESSING

(75) Inventors: Eric P. Loewen, Wilmington, NC (US); John F. Berger, Wilmington, NC (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 650 days.

(21) Appl. No.: 13/453,290

(22) Filed: Apr. 23, 2012

(65) Prior Publication Data
US 2013/0277228 A1 Oct. 24, 2013

(51) Int. Cl.
| | | |
|---|---|---|
| C25C 3/34 | (2006.01) |
| C25C 1/22 | (2006.01) |
| G21C 19/42 | (2006.01) |
| G21C 19/44 | (2006.01) |

(Continued)

(52) U.S. Cl.
CPC .............. G21C 19/42 (2013.01); G21C 19/44 (2013.01); G21C 19/46 (2013.01); G21C 19/48 (2013.01)
USPC .............. 205/43; 205/47; 205/49; 205/357; 205/358; 205/367; 205/771

(58) Field of Classification Search
CPC ........ C01G 43/01; C01G 43/025; C25B 1/00; C25C 3/34; G21C 19/42; G21C 19/44
USPC ................... 205/357, 367, 46, 47, 49
See application file for complete search history.

(56) References Cited

U.S. PATENT DOCUMENTS

| | | | |
|---|---|---|---|
| 422,139 A | 2/1890 | Maxon |
| 658,891 A | 10/1900 | Carmichael |

(Continued)

FOREIGN PATENT DOCUMENTS

| | | |
|---|---|---|
| AU | 622994 | 4/1992 |
| CA | 1 142 123 | 3/1983 |

(Continued)

OTHER PUBLICATIONS

Journeau, C.; Sudreau, F.; Magne, S.; Cognet, G. "Physico-chemical analyses and solidification path reconstruction of multi-component oxidic spread melts." Materials Science and Engineering A. vol. 299. Feb. 15, 2001. pp. 249-266.*

(Continued)

Primary Examiner — Keith Hendricks
Assistant Examiner — Steven A. Friday
(74) Attorney, Agent, or Firm — Harness, Dickey & Pierce, P.L.C.

(57) ABSTRACT

A method for stabilizing a nuclear material may include electrolytically reducing the nuclear material in a first molten salt electrolyte of an electroreducer to produce a reduced material. A reducer waste may accumulate in the first molten salt electrolyte as a byproduct of the electroreduction. After the electroreduction, the reduced material may be electrolytically dissolved in a second molten salt electrolyte of an electrorefiner to produce a purified metal product on a refiner cathode assembly of the electrorefiner. As a result of the electrorefining, a first refiner waste may accumulate in the second molten salt electrolyte and a second refiner waste may accumulate in a refiner anode assembly of the electrorefiner. The reducer waste from the electroreducer and the first refiner waste from the electrorefiner may be converted into a ceramic waste form, while the second refiner waste from the electrorefiner may be converted into a metallic waste form.

18 Claims, 5 Drawing Sheets

(51) Int. Cl.
*G21C 19/46* (2006.01)
*G21C 19/48* (2006.01)
*G21C 19/40* (2006.01)

(56) References Cited

U.S. PATENT DOCUMENTS

| | | | |
|---|---|---|---|
| 2,089,738 A | 8/1935 | Elmer | |
| 2,194,444 A | 3/1940 | Hulse et al. | |
| 2,766,198 A | 10/1956 | Carosella | |
| 2,800,219 A | 7/1957 | Carroll | |
| 2,913,380 A | 11/1959 | Gullett | |
| 2,967,142 A | 1/1961 | Oliver | |
| 3,531,269 A | 9/1970 | Grady | |
| 3,562,131 A | 2/1971 | Jasberg | |
| 3,645,708 A | 2/1972 | Grady | |
| 3,697,404 A | 10/1972 | Paige | |
| 3,972,794 A | 8/1976 | Lamm | |
| 4,013,329 A | 3/1977 | Hugin | |
| 4,023,673 A | 5/1977 | Hansen | |
| 4,025,400 A | 5/1977 | Cook et al. | |
| 4,039,403 A | 8/1977 | Astley et al. | |
| 4,073,703 A | 2/1978 | Kinosz | |
| 4,148,392 A | 4/1979 | Larson et al. | |
| 4,203,531 A | 5/1980 | Reichel et al. | |
| 4,326,937 A | 4/1982 | Neumeier et al. | |
| 4,437,968 A | 3/1984 | Elliott, Jr. | |
| 4,492,621 A | 1/1985 | Stubb | |
| 4,608,135 A | 8/1986 | Brown | |
| 4,668,353 A | 5/1987 | Smith et al. | |
| 4,851,098 A | 7/1989 | Kimura et al. | |
| 4,863,580 A | 9/1989 | Epner | |
| 4,880,506 A | 11/1989 | Ackerman et al. | |
| 4,946,026 A | 8/1990 | Rickman | |
| 5,015,342 A | 5/1991 | Ginatta et al. | |
| 5,415,742 A | 5/1995 | La Camera et al. | |
| 5,454,914 A | 10/1995 | Gay | |
| 5,531,868 A | 7/1996 | Miller et al. | |
| 5,582,706 A | 12/1996 | Grantham | |
| 5,689,538 A | 11/1997 | Bonhomme | |
| 5,770,034 A | 6/1998 | Jansen et al. | |
| 5,855,749 A | 1/1999 | Kohut et al. | |
| 5,935,394 A | 8/1999 | Sivilotti et al. | |
| 6,142,291 A | 11/2000 | Schulze et al. | |
| 6,540,902 B1* | 4/2003 | Redey et al. | 205/354 |
| 6,689,260 B1 | 2/2004 | Ahluwalia et al. | |
| 6,821,405 B1 | 11/2004 | Marttila | |
| 6,866,768 B2 | 3/2005 | Bradford et al. | |
| 7,011,736 B1 | 3/2006 | Miller et al. | |
| 7,090,760 B2 | 8/2006 | Seo et al. | |
| 7,097,747 B1 | 8/2006 | Herceg et al. | |
| 7,449,635 B2 | 11/2008 | Wiant | |
| 7,563,982 B2 | 7/2009 | Kimmel | |
| 7,638,026 B1 | 12/2009 | Willit et al. | |
| 7,799,185 B1 | 9/2010 | Willit | |
| 8,248,760 B2 | 8/2012 | Abrahamsen et al. | |
| 2004/0007466 A1 | 1/2004 | Seo et al. | |
| 2004/0134785 A1 | 7/2004 | Gay et al. | |
| 2004/0168932 A1 | 9/2004 | Wang | |
| 2005/0067291 A1 | 3/2005 | Haiki et al. | |
| 2005/0205428 A1 | 9/2005 | Dees et al. | |
| 2005/0233634 A1 | 10/2005 | Kollmann | |
| 2006/0067291 A1 | 3/2006 | Nakata | |
| 2006/0091017 A1 | 5/2006 | Lam | |
| 2006/0096853 A1 | 5/2006 | King | |
| 2007/0082551 A1 | 4/2007 | Oesterhaus | |
| 2007/0295601 A1 | 12/2007 | Bayer | |
| 2008/0128270 A1 | 6/2008 | Hiraiwa et al. | |
| 2008/0142374 A1 | 6/2008 | Iwama et al. | |
| 2008/0152270 A1 | 6/2008 | Engesser et al. | |
| 2009/0050483 A1 | 2/2009 | Li | |
| 2009/0152124 A1 | 6/2009 | Ashford et al. | |
| 2010/0276259 A1 | 11/2010 | Phalen | |
| 2011/0100328 A1 | 5/2011 | Paul | |
| 2011/0180409 A1 | 7/2011 | Willit et al. | |

FOREIGN PATENT DOCUMENTS

| | | |
|---|---|---|
| DE | 26 00 344 | 7/1977 |
| DE | 3837572 A1 | 5/1989 |
| DE | 19845258 | 3/2000 |
| EP | 0 286 092 | 10/1988 |
| EP | 0 736 929 | 10/1996 |
| EP | 2224542 | 9/2010 |
| GB | 284678 | 11/1928 |
| GB | 506590 | 5/1939 |
| GB | 516775 | 1/1940 |
| JP | H05279887 | 10/1993 |
| JP | H0972991 A | 3/1997 |
| JP | 2006308442 A | 11/2006 |
| WO | WO 02/066709 | 8/2002 |
| WO | WO 2004/018737 | 3/2004 |
| WO | WO 2004/031453 | 4/2004 |
| WO | WO 2005/035404 | 4/2005 |
| WO | WO 2006/007863 | 1/2006 |
| WO | WO 2009/062005 | 5/2009 |
| WO | WO 2010/080761 | 7/2010 |

OTHER PUBLICATIONS

International Atomic Energy Agency (IAEA). Storage and Disposal of Spent Fuel and High Level Radioactive Waste. Additional paper to the IAEA's Nuclear Technology Review 2006. Jul. 3, 2006.*

Morss, L.R.; Lewis, M.A.; Richmann, M.K.; Lexa, D. "Cerium, uranium, and plutonium behavior in glass-bonded sodalite, a ceramic nuclear waste form." Journal of Alloys and Compounds. vols. 303-304. May 24, 2000. pp. 42-48.*

Abraham, D.P.; Keiser, Jr., D.D.; McDeavitt, S.M. "Metal waste forms from treatment of EBR-II spent fuel." Argonne National Laboratory. Presented at Spectrum '98 Conference. Sep. 18, 1998.*

International Panel on Fissile Materials (IPFM). "Spent fueld from nuclear power reactors: An overview of a new study by the INternational Panel on Fissile Materials" (Draft for Discussion). Jun. 2011.*

World Nuclear Association. "How uranium ore is made into nuclear fuel." Last accessed Oct. 10, 2014. <http://www.world-nuclear.org/Nuclear-Basics/How-is-uranium-ore-made-into-nuclear-fuel-/>.*

Jeong, et al., "Electrolytic production of metallic Uranium from U3O8 in a 20-kg batch scale reactor", Journal of Radioanalytical and Nuclear Chemistry, vol. 268, No. 2, pp. 349-356 (2006).

"Proceedings of GLOBAL 2005", Tsukuba, Japan, Oct 9-13, 2005, Paper No. 488.

Copy of EP Search Report issued in connection with corresponding EP Patent Application No. 13163951 dated on Aug. 29, 2013.

Herrmann, S. et al., "Electrolytic Reduction of Spent Oxide Fuel—Bench-Scale Test Results", Proceedings of GLOBAL 2005, Oct. 2005.

International Search Report and Written Opinion issued in International Patent Application No. PCT/US2012/058664, mailed Jul. 8, 2013.

International Search Report and Written Opinion issued in International Patent Application No. PCT/US2012/058659, mailed Jul. 5, 2013.

International Search Report and Written Opinion issued in International Patent Application No. PCT/US2012/058661, mailed Jul. 25, 2013.

Figueroa, J. et al., "GTRI Progress in Developing Pyrochemical Processes for Recovery of Fabrication Scrap and Reprocessing of Monolithic U-MO Fuel", RERTR 2011—International Meeting on Reduced Enrichment for Research and Test Reactors, Oct. 23, 2011, XP055071122.

International Search Report and Written Opinion issued in International Patent Application No. PCT/US2012/058663, issued Aug. 12, 2013.

(56) References Cited

OTHER PUBLICATIONS

International Search Report and Written Opinion issued in International Patent Application No. PCT/US2012/058531, issued Aug. 2, 2013.
International Search Report dated Jan. 20, 2012 issued in PCT/US2011/053589.
International Search Report dated Jan. 30, 2012 issued in PCT/US2011/053878.
International Search Report dated Feb. 6, 2012 issued in PCT/US2011/053872.
International Search Report dated May 11, 2012 issued in PCT/US2011/053871.

* cited by examiner

METHOD FOR CORIUM AND USED NUCLEAR FUEL STABILIZATION PROCESSING

BACKGROUND

1. Field

The present invention relates to a chemical separations method for processing a nuclear fuel.

2. Description of Related Art

After a reactor accident, efforts are typically made to have the reactor core reprocessed and/or placed in interim storage. However, the mitigation of the reactor accident may be complicated by the introduction of foreign materials. For instance, in the Fukushima Daiichi accident in 2011, seawater was used in an attempt to cool the reactors. As a consequence of the use of seawater, sea salts were deposited in the reactors. Accordingly, a conventional facility for subsequently processing the melted fuel may be damaged or degraded by the presence of the sea salts. Furthermore, the integrity of metal containers intended for subsequently storing the recovered fuel from the reactor core may be compromised by the corrosive action of the sea salts.

SUMMARY

A method for stabilizing a nuclear material may include loading the nuclear material into an electroreducer. The electroreducer may include a first molten salt electrolyte and a reducer cathode assembly configured to hold the nuclear material. The nuclear material may be reduced in the first molten salt electrolyte of the electroreducer to produce a reduced material in the reducer cathode assembly. A reducer waste may be accumulated in the first molten salt electrolyte as a byproduct of the electroreduction process. After the electroreduction process, the reduced material may be loaded into an electrorefiner. The electrorefiner may include a second molten salt electrolyte, a refiner cathode assembly, and a refiner anode assembly configured to hold the reduced material. The reduced material may be electrolytically dissolved in the second molten salt electrolyte of the electrorefiner to produce a purified metal product on the refiner cathode assembly. As a result of the electrorefining, a first refiner waste may be accumulated in the second molten salt electrolyte and a second refiner waste may be accumulated in the refiner anode assembly.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1:
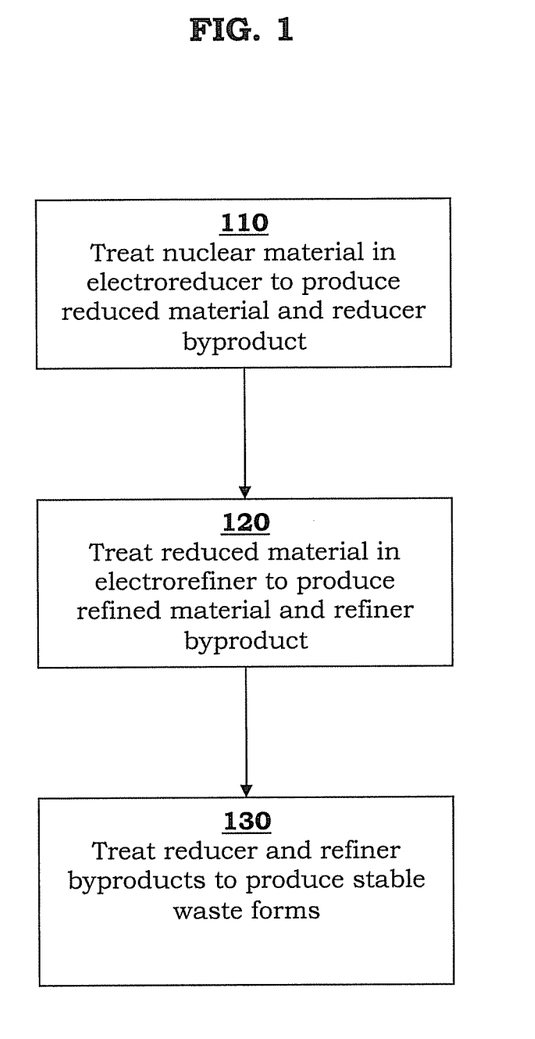
FIG. 1 is a flow diagram of a method for stabilizing a nuclear material according to a non-limiting embodiment of the present invention.

FIG. 1 is a flow diagram of a method for stabilizing a nuclear material according to a non-limiting embodiment of the present invention. Referring to step 110 in FIG. 1, nuclear material from a reactor may be treated in an electroreducer to produce a reduced material and a reducer byproduct. Referring to step 120 in FIG. 1, the reduced material from the electroreducer may be treated in an electrorefiner to produce a refined material and a refiner byproduct. Referring to step 130 in FIG. 1, the reducer byproduct from the electroreducer and the refiner byproduct from the electrorefiner may be treated to produce stable waste forms.

The nuclear material referred to herein may be corium, although example embodiments are not limited thereto. As understood by those of ordinary skill in the art, corium is a fuel containing material (FCM) that is formed during a nuclear meltdown. In particular, corium is a lava-like molten mixture of portions of a nuclear reactor core and may include nuclear fuel, fission products, control rods, structural materials from the affected parts of the reactor, products of their chemical reaction with air, water, and steam, and/or molten concrete from the floor of the reactor room in situations where the reactor vessel is breached. The composition of corium depends on the type of the reactor and, specifically, on the materials used in the control rods and the coolant. For instance, there are differences between pressurized water reactor (PWR) corium and boiling water reactor (BWR) corium. In addition to corium, it should be understood that the nuclear material referred to herein may include used nuclear fuel or other analogous materials in need of similar treatment.

Figure 2:
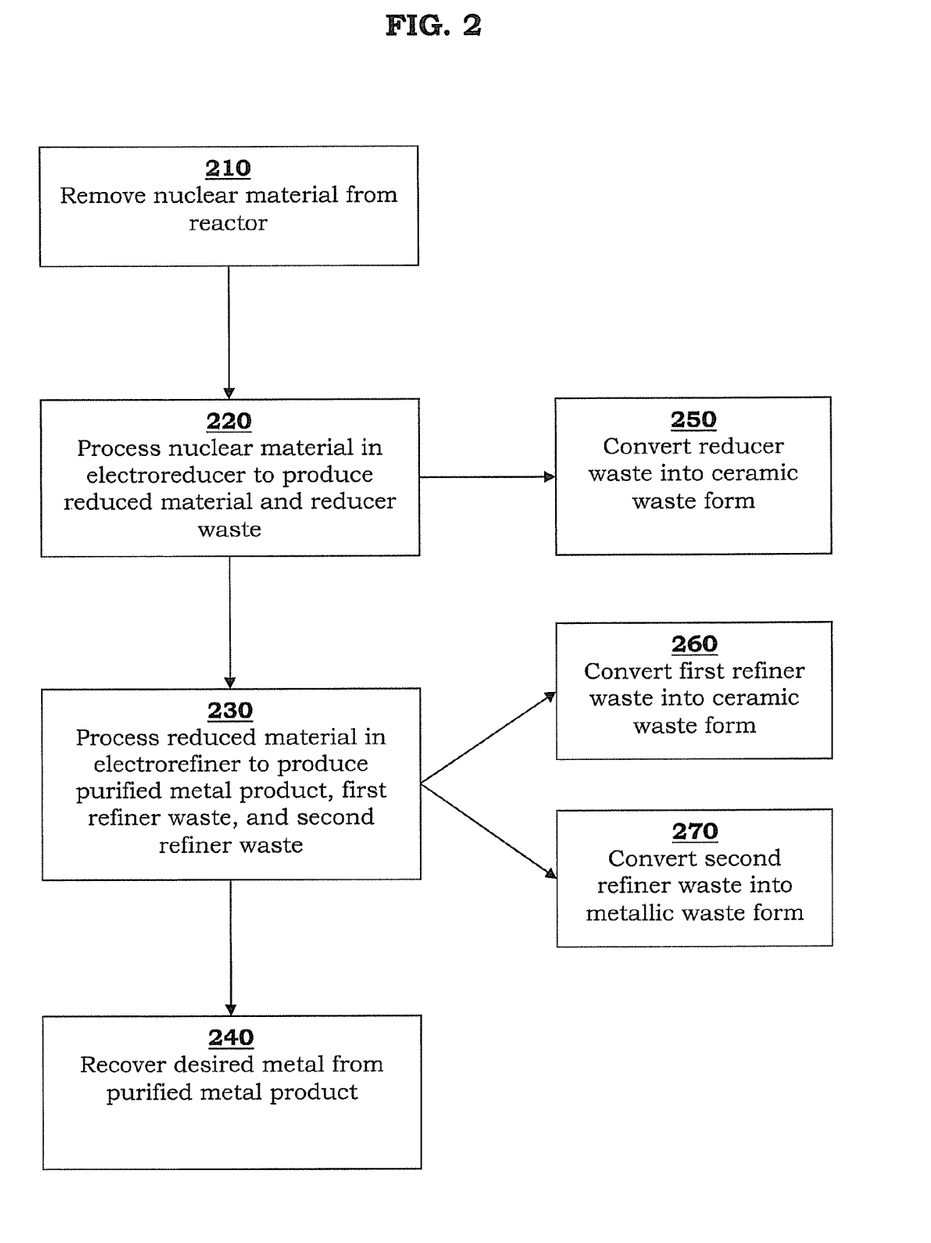
FIG. 2 is a flow diagram of another method for stabilizing a nuclear material according to a non-limiting embodiment of the present invention.

FIG. 2 is a flow diagram of another method for stabilizing a nuclear material according to a non-limiting embodiment of the present invention. Referring to step 210 in FIG. 2, nuclear material may be removed from a reactor. Referring to step 220 in FIG. 2, the nuclear material from the reactor may be processed in an electroreducer to produce a reduced material and a reducer waste. Referring to step 230 in FIG. 2, the reduced material from the electroreducer may be processed in an electrorefiner to produce a purified metal product, a first refiner waste, and a second refiner waste. Referring to step 240 in FIG. 2, the purified metal product may be recovered from the electrorefiner. Additionally, the purified metal product may be further processed to recover a desired metal from the purified metal product. Referring to step 250 in FIG. 2, the reducer waste in the electroreducer may be converted into a ceramic waste form. Referring to step 260 in FIG. 2, the first refiner waste in the electrorefiner may be converted into a ceramic waste form. Referring to step 270 in FIG. 2, the second refiner waste in the electrorefiner may be converted into a metallic waste form.

Figure 3:
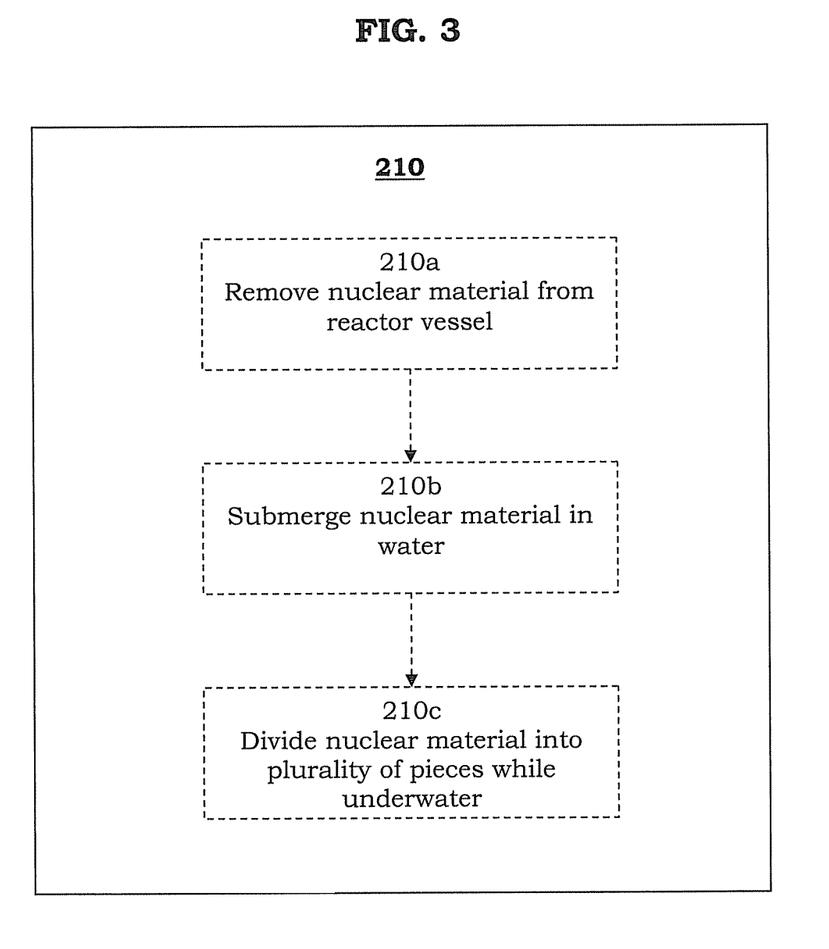
FIG. 3 is a flow diagram of step 210 in FIG. 2 according to a non-limiting embodiment of the present invention.

FIG. 3 is a flow diagram of step 210 in FIG. 2 according to a non-limiting embodiment of the present invention. Referring to step 210a in FIG. 3, nuclear material may be removed from a reactor vessel. Referring to step 210b in FIG. 3, the nuclear material from the reactor vessel may be submerged in water. For example, the nuclear material may be submerged in an existing pool (e.g., fuel pool, suppression pool) of the reactor. Referring to step 210c of FIG. 3, the nuclear material may be divided into a plurality of smaller pieces while underwater.

Figure 4:
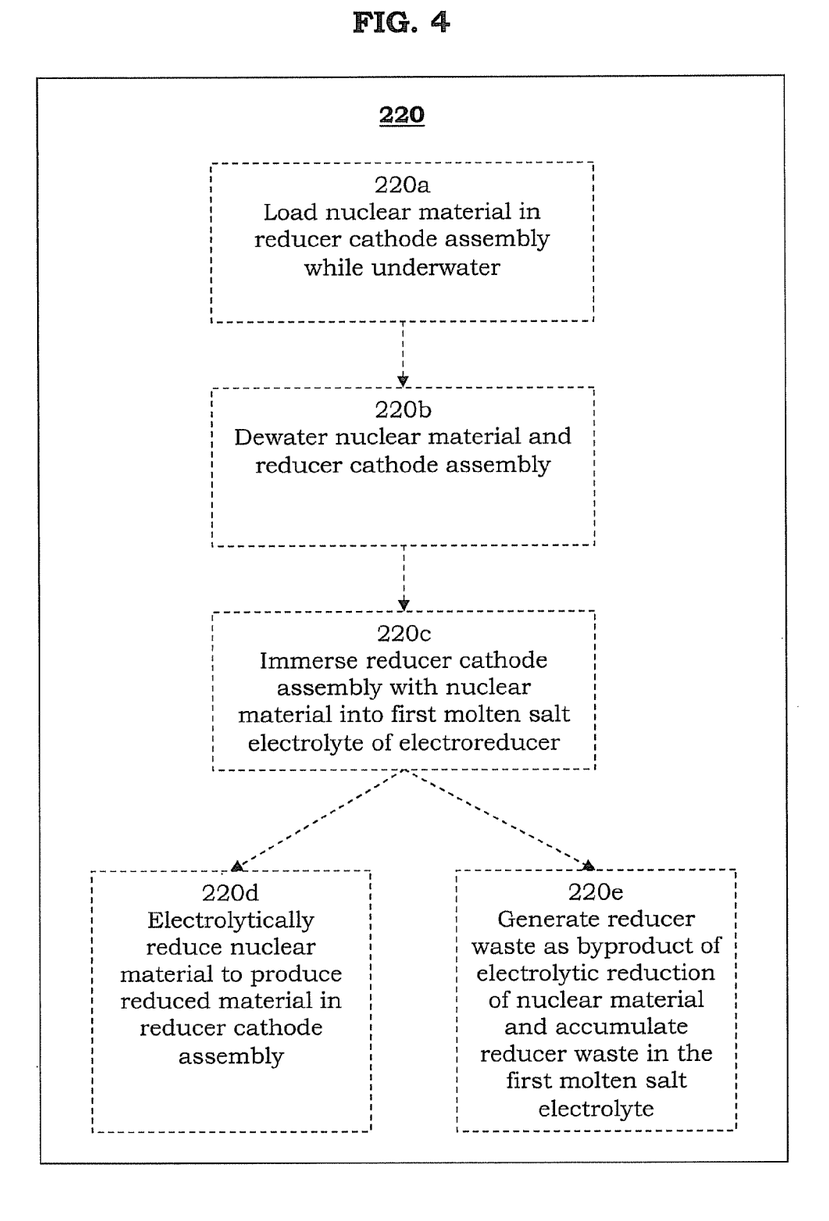
FIG. 4 is a flow diagram of step 220 in FIG. 2 according to a non-limiting embodiment of the present invention.

FIG. 4 is a flow diagram of step 220 in FIG. 2 according to a non-limiting embodiment of the present invention. Referring to step 220a in FIG. 4, the nuclear material may be loaded in a reducer cathode assembly while underwater. Referring to step 220b in FIG. 4, the nuclear material and the reducer cathode assembly may be dewatered. Referring to step 220c in FIG. 4, the reducer cathode assembly with the nuclear material may be immersed into the first molten salt electrolyte of the electroreducer. Referring to step 220d in FIG. 4, the nuclear material may be electrolytically reduced by the first molten salt electrolyte so as to produce a reduced material in the reducer cathode assembly. Referring to step 220e in FIG. 4, a reducer waste may be generated as a byproduct of the electrolytic reduction of the nuclear material in the reducer cathode assembly of the electroreducer. The reducer waste may be accumulated in the first molten salt electrolyte of the electroreducer.

Figure 5:
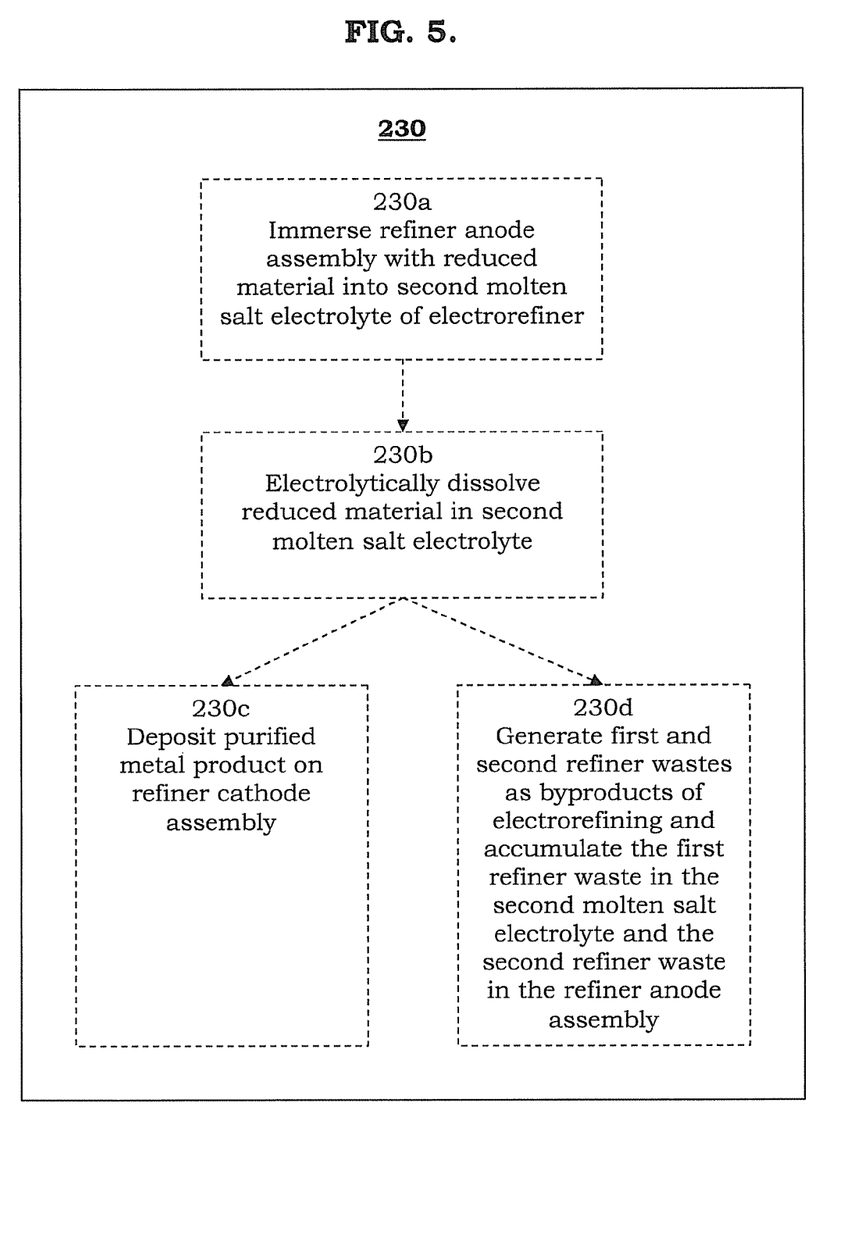
FIG. 5 is a flow diagram of step 230 in FIG. 2 according to a non-limiting embodiment of the present invention.

FIG. 5 is a flow diagram of step 230 in FIG. 2 according to a non-limiting embodiment of the present invention. Referring to step 230a in FIG. 5, the refiner anode assembly with the reduced material may be immersed into the second molten salt electrolyte of the electrorefiner. Referring to step 230b in FIG. 5, the reduced material in the refiner anode assembly may be electrolytically dissolved in the second molten salt electrolyte of the electrorefiner. Referring to step 230c in FIG. 5, the electrolytically dissolved material may deposit as a purified metal product on the refiner cathode assembly of the electrorefiner. Referring to step 230d in FIG. 5, first and second refiner wastes may be generated as byproducts of the electrorefining. The first refiner waste may be accumulated in the second salt electrolyte of the electrorefiner, while the second refiner waste may be accumulated in the refiner anode assembly of the electrorefiner.

Various examples for processing nuclear materials will be discussed in further detail below. In a non-limiting embodiment, a method for stabilizing a nuclear material may include loading the nuclear material into an electroreducer. The electroreducer may include a first molten salt electrolyte and a reducer cathode assembly configured to hold the nuclear material. The nuclear material may be reduced in the first molten salt electrolyte of the electroreducer to produce a reduced material in the reducer cathode assembly. A reducer waste may be accumulated in the first molten salt electrolyte of the electroreducer. After the reduction reaction in the electroreducer, the reduced material may be loaded into an electrorefiner. The electrorefiner may include a second molten salt electrolyte, a refiner cathode assembly, and a refiner anode assembly configured to hold the reduced material. The reduced material may be electrolytically dissolved in the second molten salt electrolyte of the electrorefiner to produce a purified metal product which deposits on the refiner cathode assembly. A first refiner waste may be accumulated in the second molten salt electrolyte of the electrorefiner, and a second refiner waste may be accumulated in the refiner anode assembly of the electrorefiner.

The nuclear material loaded into the electroreducer may include corium. However, it should be understood that the nuclear material may also include used nuclear fuel (e.g., used nuclear, fuel with zirconium cladding without damage) or other analogous materials in need of similar treatment. In a non-limiting embodiment, the nuclear material may include a feed material including uranium oxide. Furthermore, the nuclear material may include foreign materials as a result of a nuclear accident. For example, where sea water is injected to cool a reactor during a nuclear accident, the feed material may include sea salts. In particular, the feed material may include sodium chloride (NaCl), sulfur (S), magnesium (Mg), calcium (Ca), potassium (K), and/or boron (B). However, because the electrochemical method herein is a dry process (performed using a salt bath), substantially all of the residual salts from the sea water injections may be effectively removed and/or stabilized.

The nuclear material may be placed into the reducer cathode assembly while the nuclear material and the reducer cathode assembly are underwater to mitigate contamination spread. For example, the nuclear material may be placed into the reducer cathode assembly while the nuclear material and the reducer cathode assembly are submerged in an existing pool (e.g., fuel pool, suppression pool) of a nuclear reactor.

The nuclear material may also be divided into a plurality of pieces prior to loading the nuclear material into the electroreducer. The dividing may be performed to a desired size using conventional shears or a conventional grinder. The dividing of the nuclear material may be performed underwater. For example, the dividing of the nuclear material may be performed while the nuclear material is submerged in an existing pool (e.g., fuel, pool, suppression pool) of a nuclear reactor. In a non-limiting embodiment, the nuclear material may be divided into a plurality of pieces and then placed into a reducer cathode assembly while submerged in the same existing pool.

The reducer cathode assembly loaded with the nuclear material may be dewatered prior to reducing the nuclear material in the first molten salt electrolyte of the electroreducer. In a non-limiting embodiment, the dewatering may be performed by removing the reducer cathode assembly loaded with the nuclear material from the water and allowing it to heat up from the natural decay heat. The dewatering may also be assisted with a heater and/or a vacuum. Additionally, when a vacuum is used, a high-efficiency particulate air (HEPA) filter may be utilized to minimize or prevent the escape of harmful particles.

The first molten salt electrolyte in the electroreducer may include a molten salt bath of lithium chloride (LiCl). When immersed in the first molten salt electrolyte, the nuclear material may be reduced to its metallic form. For example, uranium oxide undergoing electroreduction becomes a uranium metal. During the electrolytic reduction of the nuclear material to a reduced material, a reducer waste may be accumulated in the first molten salt electrolyte. The reducer waste may include halides including at least one of a Group 1 element and a Group 2 element. In a non-limiting embodiment, the halide may be a chloride, the Group 1 element may be cesium (Cs), and the Group 2 element may be strontium (Sr). In particular, during the electroreduction process, the cesium, strontium, and/or other Group 1 and 2 fission products may oxidize to form chlorides.

After the electroreduction process, the reduced material is loaded into an electrorefiner. In particular, the reduced material from the electroreducer is contained within a refiner anode assembly and immersed into the second molten salt electrolyte of the electrorefiner. The second molten salt electrolyte may be a molten salt bath of lithium chloride, a LiCl—KCl eutectic, or an equivalent thereof. In the second molten salt electrolyte, the reduced material may be electrolytically dissolved such a metal from the reduced material deposits on the refiner cathode assembly as a purified metal product.

As a result of the electrorefining, a first refiner waster and a second refiner waste may be generated in the electrorefiner. In particular, a first refiner waste may be accumulated in the second molten salt electrolyte, while a second refiner waste may be accumulated in the anode refiner assembly. For example, the first refiner waste may include halides including a transuranic element. It is understood by those of ordinary skill in the art that a transuranic element is one having an atomic number greater than that of uranium. The second refiner waste may include zirconium and/or a noble metal.

The reducer waste from the electroreducer and/or the first refiner waste from the electrorefiner may be converted into a ceramic waste form. The conversion into a ceramic waste form may include producing a glass-bonded sodalite (Ca—Al—Si) and/or SYNROC. The glass-bonded sodalite may be produced from the thermal conversion of zeolite or other glass systems to stabilize the salts resulting from the electroreducing and/or electrorefining. For example, the waste salts may be occluded into a zeolite structure in a heated V-mixer mixed with glass frit and consolidated into a monolithic form in a furnace. SYNROC may be composed of titanate minerals (e.g., zirconolite, perovskite) along with rutile, a small amount of metal alloy, and a portion of the nuclear waste. The mixture may be calcined and compressed to form a hard, dense synthetic rock. The ceramic waste form will contain a majority of the fission products and transuranics.

The second refiner waste from the electrorefiner may be converted into a metallic waste form. The conversion into a metallic waste form may include producing metal ingots. The metal ingots may contain stainless steel. The metal ingots may stabilize noble metal fission products, non-actinide fuel containing components, and/or damaged zirconium (Zr) cladding materials. The ceramic waste forms and the metallic waste forms herein are more leach-resistant to future water emission than uranium oxide fuel by at least a factor of one million.

The electrochemical method herein has a passive process safety aspect. In particular, the electrochemical reactions of the electroreducer and electrorefiner are nonspontaneous and are driven by supplying electricity. As a result, if power is lost, the electrochemical reactions will stop and the molten salt electrolytes of the electroreducer and electrorefiner will freeze, thereby solidifying the radioactive elements therein.

The electrorefiner referred to herein may be as described in U.S. application Ser. No. 13/335,082, filed Dec. 22, 2011, "ELECTROREFINER SYSTEM FOR RECOVERING PURIFIED METAL FROM IMPURE NUCLEAR FEED MATERIAL," HDP Ref. 8564-000252/US, GE Ref. 24NS250931, the entire contents of which is incorporated herein by reference. The electrorefiner system may be used to recover a purified metal (e.g., uranium) from a relatively impure nuclear feed material (e.g., impure uranium feed material). The impure nuclear feed material may be a metallic product of an electrolytic oxide reduction system. The electrolytic oxide reduction system may be configured to facilitate the reduction of an oxide to its metallic form so as to permit the subsequent recovery of the metal. The electrolytic oxide reduction system (also referred to herein as an electroreducer) may be as described in U.S. application Ser. No.

12/978,027, filed Dec. 23, 2010, "ELECTROLYTIC OXIDE REDUCTION SYSTEM," HDP Ref. 8564-000228/US, GE Ref. 24AR246140, the entire contents of which is incorporated herein by reference.

Generally, the electrorefiner system may include a vessel, a plurality of cathode assemblies, a plurality of anode assemblies, a power system, a scraper, and/or a conveyor system. The power system may be as described in U.S. application Ser. No. 13/335,121, HDP Ref. 8564-000254/US, GE Ref. 24AR252783, filed Dec. 22, 2011, titled "CATHODE POWER DISTRIBUTION SYSTEM AND METHOD OF USING THE SAME FOR POWER DISTRIBUTION," the entire contents of which are incorporated herein by reference. The scraper may be as described in U.S. application Ser. No. 13/335,209, HDP Ref. 8564-000255/US, GE Ref. 24AR252787, filed Dec. 22, 2011, titled "CATHODE SCRAPER SYSTEM AND METHOD OF USING THE SAME FOR REMOVING URANIUM," the entire contents of which are incorporated herein by reference. The conveyor system may be as described in U.S. application Ser. No. 13/335,140, HDP Ref. 8564-000260/US, GE Ref. 24AR256355, filed Dec. 22, 2011, titled "CONTINUOUS RECOVERY SYSTEM FOR ELECTROREFINER SYSTEM," the entire contents of which are incorporated herein by reference. However, it should be understood that the electrorefiner system is not limited thereto and may include other components that may not have been specifically identified herein. A table of the related applications incorporated by reference is provided below.

reduced and the oxygen (O) from the metal oxide (MO) feed material dissolves into the molten salt electrolyte as an oxide ion, thereby leaving the metal (M) behind in the cathode assemblies. The cathode reaction may be as follows:

$$MO + 2e^- \rightarrow M + O^{2-}$$

At the anode assemblies, the oxide ion is converted to oxygen gas. The anode shroud of each of the anode assemblies may be used to dilute, cool, and remove the oxygen gas from the electrolytic oxide reduction system during the process. The anode reaction may be as follows:

$$O^{2-} \rightarrow \tfrac{1}{2}O_2 + 2e^-$$

The metal oxide may be uranium dioxide ($UO_2$), and the reduction product may be uranium metal. However, it should be understood that other types of oxides may also be reduced to their corresponding metals with the electrolytic oxide reduction system. Similarly, the molten salt electrolyte used in the electrolytic oxide reduction system is not particularly limited thereto and may vary depending of the oxide feed material to be reduced.

After the electrolytic oxide reduction, the basket containing the metallic product in the electrolytic oxide reduction system is transferred to the electrorefiner system according to the present invention for further processing to obtain a purified metal from the metallic product. Stated more clearly, the metallic product from the electrolytic oxide reduction system will serve as the impure nuclear feed material for the electrorefiner system according to the present invention. Notably,

| Related Applications Incorporated by Reference | | | |
|---|---|---|---|
| U.S. Appl. No. | HDP/GE Ref. | Filing Date | Title |
| 12/978,027 | 8564-000228/US 24AR246140 | Filed on Dec. 23, 2010 | ELECTROLYTIC OXIDE REDUCTION SYSTEM |
| 13/335,082 | 8564-000252/US 24NS250931 | Filed on Dec. 22, 2011 | ELECTROREFINER SYSTEM FOR RECOVERING PURIFIED METAL FROM IMPURE NUCLEAR FEED MATERIAL |
| 13/335,139 | 8564-000253/US 24AR252782 | Filed on Dec. 22, 2011 | BUS BAR ELECTRICAL FEEDTHROUGH FOR ELECTROREFINER SYSTEM |
| 13/335,121 | 8564-000254/US 24AR252783 | Filed on Dec. 22, 2011 | CATHODE POWER DISTRIBUTION SYSTEM AND METHOD OF USING THE SAME FOR POWER DISTRIBUTION |
| 13/335,209 | 8564-000255/US 24AR252787 | Filed on Dec. 22, 2011 | CATHODE SCRAPER SYSTEM AND METHOD OF USING THE SAME FOR REMOVING URANIUM |
| 13/335,140 | 8564-000260/US 24AR256355 | Filed on Dec. 22, 2011 | CONTINUOUS RECOVERY SYSTEM FOR ELECTROREFINER SYSTEM |

As noted above, the impure nuclear feed material for the electrorefiner system may be a metallic product of an electrolytic oxide reduction system. During the operation of an electrolytic oxide reduction system, a plurality of anode and cathode assemblies are immersed in a molten salt electrolyte. In a non-limiting embodiment of the electrolytic oxide reduction system, the molten salt electrolyte may be lithium chloride (LiCl). The molten salt electrolyte may be maintained at a temperature of about 650° C. (+50° C., −30° C.). An electrochemical process is carried out such that a reducing potential is generated at the cathode assemblies, which contain the oxide feed material (e.g., metal oxide). Under the influence of the reducing potential, the metal ion of the metal oxide is reduced and the oxygen (O) from the metal oxide (MO) feed while the basket containing the metallic product is a cathode assembly in the electrolytic oxide reduction system, the basket containing the metallic product is an anode assembly in the electrorefiner system. Compared to prior art apparatuses, the electrorefiner system according to the present invention allows for a significantly greater yield of purified metal.

The electrorefiner system includes a vessel, a plurality of cathode assemblies, a plurality of anode assemblies, a power system, a scraper, and/or a conveyor system. Each of the plurality of cathode assemblies may include a plurality of cathode rods. The power system may include an electrical feedthrough that extends through the floor structure. The floor structure may be a glovebox floor of a glovebox. Alternatively, the floor structure may be a support plate of a hot-cell facility. The conveyor system may include an inlet pipe, a trough, a turn idler, a chain, a plurality of flights, an exit pipe, and/or a discharge chute.

The vessel is configured to maintain a molten salt electrolyte. In a non-limiting embodiment, the molten salt electrolyte may be LiCl, a LiCl—KCl eutectic, or another suitable medium. The vessel may be situated such that a majority of the vessel is below the floor structure. For instance, an upper portion of the vessel may extend above the floor structure through an opening in the floor structure. The opening in the floor structure may correspond to the dimensions of the vessel. The vessel is configured to receive the plurality of cathode assemblies and the plurality of anode assemblies.

The plurality of cathode assemblies are configured to extend into the vessel so as to at least be partially submerged in the molten salt electrolyte. For instance, the dimensions of the plurality of cathode assemblies and/or the vessel may be adjusted such that the majority of the length of the plurality of cathode assemblies is submerged in the molten salt electrolyte in the vessel. Each cathode assembly may include a plurality of cathode rods having the same orientation and arranged so as to be within the same plane.

The plurality of anode assemblies may be alternately arranged with the plurality of cathode assemblies such that each anode assembly is flanked by two cathode assemblies. The plurality of cathode assemblies and anode assemblies may be arranged in parallel. Each anode assembly may be configured to hold and immerse an impure uranium feed material in the molten salt electrolyte maintained by the vessel. The dimensions of the plurality of anode assemblies and/or the vessel may be adjusted such that the majority of the length of the plurality of anode assemblies is submerged in the molten salt electrolyte in the vessel. The electrorefiner system may have eleven cathode assemblies and ten anode assemblies, although the example embodiments herein are not limited thereto.

In the electrorefiner system, a power system is connected to the plurality of cathode assemblies and anode assemblies. During operation of the electrorefiner system, the power system is configured to supply a voltage adequate to oxidize the impure uranium feed material in the plurality of anode assemblies to form uranium ions that migrate through the molten salt electrolyte and deposit on the plurality of cathode rods of the plurality of cathode assemblies as purified uranium.

To initiate the removal of the purified uranium, the scraper is configured to move up and down along the length of the plurality of cathode rods to dislodge the purified uranium deposited on the plurality of cathode rods of the plurality of cathode assemblies. As a result of the scraping, the dislodged purified uranium sinks through the molten salt electrolyte to the bottom of the vessel.

The conveyor system is configured such that at least a portion of it is disposed at the bottom of the vessel. For example, the trough of the conveyor system may be disposed at the bottom of the vessel such that the purified uranium dislodged from the plurality of cathode rods accumulates in the trough. The conveyor system is configured to transport the purified uranium accumulated in the trough through an exit pipe so as to remove the purified uranium from the vessel.

The conveyor system may include an inlet pipe, a trough, a turn idler, a chain engaged with the turn idler, a plurality of flights, an exit pipe, and/or a discharge chute. The trough is positioned in the vessel so as to be below the plurality of cathode assemblies and anode assemblies. The size of the trough may be adjusted such that the trough covers all or substantially all of the bottom surface of the vessel.

The trough has a V-shaped cross-section, although example embodiments are not limited thereto. Alternatively, the trough may have a U-shaped cross-section. In a non-limiting embodiment, the upper portion of the trough may have a V-shaped cross-section, while the bottom portion of the trough may have a U-shaped or semicircular cross-section. Additionally, the trough may have a U-shaped track along the bottom of the vessel. For example, the track may extend linearly from the outlet opening of the inlet pipe, curve at a portion corresponding to the opposite end of the vessel, and extend linearly to the inlet opening of the exit pipe so as to have a U-shape based on a plan view.

The conveyor system may be configured to operate continuously during oxidation of the impure uranium feed material held by the plurality of anode assemblies, during deposition of the purified uranium on the plurality of cathode assemblies, and/or during dislodging of the purified uranium by the scraper. Alternatively, the conveyor system may be configured to operate intermittently during the operation of the electrorefiner system. The conveyor system includes a chain and a plurality of flights secured to the chain. The chain is configured to run along the bottom of the vessel and through the exit pipe. The chain and the plurality of flights are configured to engage in an endless motion of entering, exiting, and reentering the vessel. For instance, the chain and the plurality of flights may enter the vessel through the inlet pipe, travel along the U-shaped track defined by the trough at the bottom of the vessel, exit the vessel through the exit pipe, and reenter the vessel through the inlet pipe.

The plurality of flights secured to the chain may be oriented in the same direction. For instance, the plurality of flights may be oriented perpendicularly to the chain. During operation of the electrorefiner system, the plurality of flights are configured to push the purified uranium dislodged by the scraper into and through the exit pipe to a discharge chute so as to remove the purified uranium from the vessel.

The anode assembly is configured to hold and immerse an impure nuclear feed material in the molten salt electrolyte maintained by the vessel. The anode assembly may include an upper basket, a lower basket, and an anode plate housed within the upper and lower baskets. When assembled, the anode plate will extend from a top end of the upper basket to a bottom end of the lower basket. The side edges of the anode plate may be hemmed to provide rigidity. A reverse bend may also be provided down the center of the anode plate for added rigidity. The lower basket may be attached to the upper basket with four high strength rivets. In the event of damage to either the lower basket or the upper basket, the rivets can be drilled out, the damaged basket replaced, and re-riveted for continued operation.

The anode basket (which includes the upper basket and the lower basket) may be electrically connected to the anode plate. Each anode assembly is configured to engage one or more pairs (e.g., two pairs) of knife edge contacts (e.g., four knife edge contacts) so as to receive power from a suitable power supply. For example, each anode assembly may receive power from a dedicated power supply. Alternatively, all of the anode assemblies may receive power from a single dedicated power supply. The anode basket may be formed of a porous metal plate that is sufficiently open to allow molten salt electrolyte to enter and exit during the process yet fine enough to retain the impure nuclear feed material.

Stiffening ribs may be provided inside the anode basket to reduce or prevent distortion. Where vertical stiffening ribs are provided in the lower basket, the anode plate will have corresponding slots to allow clearance around the stiffening ribs when the anode plate is inserted into the anode basket. For instance, if the lower basket is provided with two vertical stiffening ribs, then the anode plate will have two corresponding slots to allow clearance around the two stiffening ribs. Additionally, position spacers may be provided near the midsection of both faces of the anode plate to ensure that the anode plate will remain in the center of the anode basket when loading the impure nuclear feed material. The position spacers may be ceramic and vertically-oriented. Furthermore, staggered spacers may be provided on the upper section of both faces of the anode plate to provide a thermal break for radiant and conductive heat transfer to the top of the anode assembly. The staggered spacers may be ceramic and horizontally-oriented. The anode assembly may also include a lift bracket with lift tabs disposed on the ends. The lift tabs are designed to interface with a lift system of the electrorefiner system.

Each of the plurality of cathode assemblies includes a plurality of cathode rods connected to a cathode bus bar. The plurality of cathode assemblies are connected to a common bus bar. When positioned within the vessel of the electrorefiner system, the cathode bus bars of the plurality of cathode assemblies may be arranged parallel to each other and perpendicularly to the common bus bar. The common bus bar is connected to an electrical feedthrough.

The upper and lower portions of each cathode rod may be formed of different materials. For instance, the upper portion of the cathode rod may be formed of a nickel alloy, and the lower portion of the cathode rod may be formed of steel, although example embodiments are not limited thereto. The lower portion of the cathode rod may sit below the molten salt electrolyte level during the operation of the electrorefiner system and may be removable to allow the lower portion to be replaced or changed to another material.

The cathode bus bar may be segmented to reduce thermal expansion, wherein each segment of the cathode bus bar may be formed of copper. The segments of the cathode bus bar may be joined with a slip connector. Additionally, the slip connector may attach to the top of a cathode rod to ensure that the cathode rod will not fall into the molten salt electrolyte. The cathode assembly is not to be limited by any of the above examples. Rather, it should be understood that other suitable configurations and materials may also be used.

When the cathode assembly is lowered into the electrorefiner system, the cathode rods will extend into the molten salt electrolyte in the vessel. The plurality of cathode assemblies may have seven cathode rods each, although the example embodiments are not limited thereto. Thus, each cathode assembly may include less than seven cathode rods or more than seven cathode rods, provided that sufficient current is being provided to the electrorefiner system.

During operation of the electrorefiner system, the cathode assembly may be kept to a suitable temperature. To maintain the appropriate operating temperature, the cathode assembly may include a cooling line that supplies a cooling gas. The cooling gas may be supplied to each side of the cathode assembly header and discharged into the glovebox, hot-cell facility, or other suitable environment where it is cooled and recycled. The cooling gas may be an inert gas (e.g., argon). As a result, the temperature of the off-gas may be lowered.

The cooling gas may be provided by the glovebox atmosphere. In a non-limiting embodiment, no pressurized gases external to the glovebox are used. In such a case, a gas supply can be pressurized using a blower inside the glovebox. All motors and controls for operating the gas supply may be located outside the glovebox for easier access and maintenance.

The power system for the electrorefiner system may include the common bus bar for the plurality of cathode assemblies. Power may be supplied to the common bus bar through the floor structure via the electrical feedthrough. As previously noted above, in addition to the disclosure herein, the electrical feedthrough may be as described in U.S. application Ser. No. 13/335,139, HDP Ref. 8564-000253/US, GE Ref. 24AR252782, filed Dec. 22, 2011, titled "BUS BAR ELECTRICAL FEEDTHROUGH FOR ELECTROREFINER SYSTEM," the entire contents of which are incorporated herein by reference.

The scraper is configured to mate with the plurality of cathode assemblies when the scraper is installed in the electrorefiner system. When installed, the plurality of cathode rods of the plurality of cathode assemblies extend through the scraper. The scraper moves along a length of the plurality of cathode rods to dislodge the purified uranium deposited thereon during the operation of the electrorefiner system.

The scraper includes a plurality of scraping units. Each of the plurality of scraping units is configured to mate with each of the plurality of cathode rods of the plurality of cathode assemblies. For instance, each of the plurality of scraping units has a hole configured to receive a corresponding cathode rod. The plurality of scraping units corresponding to each cathode assembly are connected to a common frame. The scraper may have eleven common frames, and each common frame may connect seven scraping units, although the example embodiments are not limited thereto. It should be understood that the number of common frames may be adjusted as needed to correspond to the number of cathode assemblies, and the number of scraping units may be adjusted as needed to correspond to the number of cathode rods.

The electrorefiner system may further include a screw mechanism configured to move the scraper along the length of the plurality of cathode rods, although the example embodiments are not limited thereto. It should be understood that another suitable mechanism may be used to move the scraper upwards and downwards along the length of the plurality of cathode rods.

The electrorefiner system may further include a lift system configured to selectively engage any combination of the plurality of anode assemblies so as to facilitate the simultaneous lifting of any combination of the plurality of anode assemblies that are to be removed while allowing one or more of the plurality of anode assemblies that are not to be removed to remain in place.

The lift system may include a pair of lift beams arranged along a lengthwise direction of the electrorefiner system. The lift beams may be arranged in parallel. A shaft and a mechanical actuator are associated with each end portion of the lift beams. The lift system may participate in engaging and lifting all of the plurality of anode assemblies. Alternatively, it should be understood that only some of the plurality of anode assemblies may be lifted and any combination of the plurality of anode assemblies may be allowed to remain in the vessel of the electrorefiner system. Thus, all of the anode assemblies may be simultaneously removed with the lift system or only one anode assembly may be removed. Additionally, the electrorefiner system may have ten anode assemblies and eleven cathode assemblies, although the example embodiments are not limited thereto, because the modular design of the electrorefiner system allows for more or less of the anode and cathode assemblies to be used.

The two parallel lift beams of the lift system extend along the alternating arrangement direction of the plurality of anode and cathode assemblies. The plurality of anode and cathode assemblies are arranged between the two parallel lift beams.

The two parallel lift beams may extend in a horizontal direction. The shaft of the lift system is secured underneath both end portions of each lift beam. For example, the shaft may be secured perpendicularly to both end portions of each lift beam. The mechanical actuators of the lift system are configured to drive the two parallel lift beams in a vertical direction via the shafts. A mechanical actuator is provided beneath each end portion of the two parallel lift beams.

The shaft may extend through the floor structure by way of a hermetic slide bearing. The hermetic slide bearing may include two bearing sleeves and two gland seals. The bearing sleeves may be formed of high molecular weight polyethylene. A space between the two gland seals may be pressurized with an inert gas (e.g., argon) using a port to 1.5-3" water column positive pressure (assuming a maximum glovebox atmosphere of 1.5" water column negative). The gland seals are designed to be replaced without compromising the glovebox atmosphere. An external water-cooled flange may connect the vessel to the floor structure so as to maintain a hermetic seal while limiting a temperature of the floor structure to an acceptable temperature.

The lift system may include a plurality of lift cups dispersed along the longitudinal direction of each of the lift beams. Assuming the electrorefiner system has ten anode assemblies (although example embodiments are not limited thereto), ten lift cups may be disposed on each lift beam so as to provide two lift cups for each anode assembly. The lift cups are disposed on the inner side surface of the parallel lift beams. The lift cups may be U-shaped with the ends flaring outwards. However, it should be understood that the lift cups are not limited to such but, instead, are intended to include other shapes and forms (e.g., hook) that are suitable for engaging the lift pin of an anode assembly.

Each lift cup may be provided with a solenoid, although example embodiments are not limited thereto. Each solenoid may be mounted on the opposing outer side surface of the lift beam and is configured to drive (e.g., rotate) the corresponding lift cup. By providing each lift cup with a solenoid, each lift cup can be independently driven. However, it should be understood that the lift cups (which may be in different shapes and forms) may also be operated in different ways so as to engage the lift pin of an anode assembly. For example, instead of being rotated, the lift cup may be configured to extend to extend/retract so as to engage/disengage the lift pin of an anode assembly.

The lift cups may be arranged along each lift beam such that a pair of lift cups is associated with each of the plurality of anode assemblies. A "pair" refers to a lift cup from one lift beam and a corresponding lift cup from the other lift beam. The lift cups are spaced along each lift beam such that a pair of lift cups will be aligned with the lift tabs protruding from the side ends of each anode assembly of the electrorefiner system. The lift cups may be vertically aligned with the corresponding lift tabs. Each pair of the lift cups is configured so as to be able to rotate and be positioned under the lift tabs protruding from side ends of a corresponding anode assembly. Otherwise, the lift cups may be rotated so as to be positioned above the lift tabs. When a pair of lift cups are positioned above the lift tabs of a corresponding anode assembly, lifting will not occur for that anode assembly when the lift beams are raised.

The lift system may be employed during the operation or maintenance of the electrorefiner system. For example, after the electrorefining process, the existing batch of anode assemblies may be removed from the electrorefiner system with the lift system to allow a new batch of anode assemblies to be processed. In the raised position, a portion of the anode assembly may remain under the cover of the vessel so as to act as a heat block until ready for removal.

During the electrorefining process, the lift cups may be inverted above the lift tabs of the anode assemblies. When one or more anode assemblies are to be removed, the lift beams are lowered, and the lift cups on the lift beams are rotated by the solenoid so as to be positioned under the lift tabs of the anode assemblies to be removed. Next, the mechanical actuators drive the shafts upward in a vertical direction, thereby raising the parallel lift beams along with the pertinent anode assemblies. While in the raised position, an electrical lock-out may keep the lift cups from actuating until the lift beams have been fully lowered. This feature will ensure that the anode assemblies will not disengage while in the raised position. Once the existing batch of anode assemblies has been retrieved and substituted with a new batch of anode assemblies containing impure nuclear feed material, the anode assemblies with the impure nuclear feed material may be lowered into the molten salt electrolyte in the vessel of the electrorefiner system via the lift system.

Alternatively, the anode assemblies may be removed from the electrorefiner system to allow for inspection, repairs, the replacement of parts, or to otherwise allow access to the portion of the vessel that is normally occupied by the anode assemblies. The lift process may be as described above. Once the pertinent maintenance or other activity has been performed, the anode assemblies may be lowered into the molten salt electrolyte in the vessel of the electrorefiner system via the lift system. All of the anode assemblies may be simultaneously removed when the lift system is in the raised position. Alternatively, it should be understood that the lift system is configured to allow the removal of anywhere from one to all of the anode assemblies, wherein the anode assemblies may be adjacent or non-adjacent. Once the desired anode assemblies are in the raised position, their removal from the lift system may be achieved with another mechanism (e.g., crane) within the glovebox or hot-cell facility.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method for stabilizing corium to produce a stable waste form, the method comprising:
   loading the corium into an electroreducer, the electroreducer including a first molten salt electrolyte and a reducer cathode assembly configured to hold the corium;
   reducing the corium in the first molten salt electrolyte of the electroreducer to produce a reduced material in the reducer cathode assembly;
   accumulating a reducer waste in the first molten salt electrolyte;
   loading the reduced material into an electrorefiner, the electrorefiner including a second molten salt electrolyte, a refiner cathode assembly, and a refiner anode assembly configured to hold the reduced material;
   electrolytically dissolving the reduced material in the second molten salt electrolyte of the electrorefiner to produce a purified metal product on the refiner cathode assembly; and
   accumulating a first refiner waste in the second molten salt electrolyte and a second refiner waste in the refiner anode assembly.

2. The method of claim 1, wherein the loading the corium into the electroreducer includes placing the corium into the reducer cathode assembly while the corium and the reducer cathode assembly are underwater.

3. The method of claim 2, further comprising:
dewatering the reducer cathode assembly prior to reducing the corium in the first molten salt electrolyte of the electroreducer.

4. The method of claim 1, wherein the loading the corium into the electroreducer includes placing the corium into the reducer cathode assembly while the corium and the reducer cathode assembly are submerged in an existing pool of a nuclear reactor.

5. The method of claim 1, wherein the reducing the corium in the first molten salt electrolyte includes immersing the corium in a molten salt bath of lithium chloride.

6. The method of claim 1, wherein the accumulating a reducer waste involves accumulating halides including at least one of a Group 1 element and a Group 2 element.

7. The method of claim 1, wherein the electrolytically dissolving the reduced material in the second molten salt electrolyte includes immersing the reduced material in a molten salt bath of lithium chloride or a LiCl—KCl eutectic.

8. The method of claim 1, wherein the accumulating a first refiner waste involves accumulating halides including a transuranic element in the second molten salt electrolyte.

9. The method of claim 1, wherein the accumulating a second refiner waste involves accumulating zirconium and a noble metal in the refiner anode assembly.

10. The method of claim 1, further comprising:
dividing the corium into a plurality of pieces prior to loading the corium into the electroreducer.

11. The method of claim 10, wherein the dividing the corium is performed underwater.

12. The method of claim 10, wherein the dividing the corium is performed while the corium is submerged in an existing pool of a nuclear reactor.

13. The method of claim 1, further comprising:
converting the reducer waste from the electroreducer and the first refiner waste from the electrorefiner into a ceramic waste form.

14. The method of claim 13, wherein the converting into a ceramic waste form includes producing a glass-bonded sodalite.

15. The method of claim 1, further comprising:
converting the second refiner waste from the electrorefiner into a metallic waste form.

16. The method of claim 15, wherein the converting into a metallic waste form includes producing metal ingots.

17. The method of claim 1, wherein the corium is produced during a nuclear meltdown of a reactor, and sea water is injected to cool the reactor.

18. The method of claim 1, wherein corium includes sea salts.

* * * * *